Patented Mar. 30, 1954

2,673,810

UNITED STATES PATENT OFFICE 2,673,810

RETARDED CEMENT

Norman C. Ludwig, Chicago, Ill., assignor to Universal Atlas Cement Company, a corporation of Indiana No Drawing. Application January 7, 1952,
Serial No. 265,359

4 Claims. (Cl. 106—93)

This invention is particularly concerned with hydraulic cements, for example, Portland and Portland type cements, used in the cementing of oil wells having a depth in the neighborhood of 6,000 to 14,000 feet or greater. In cementing these wells the cement is mixed with water to form a pumpable neat slurry which is pumped into the well and down the hole into the place where it is desired to have it harden. Due to the depth of the well considerable time is required to pump the slurry into place. Furthermore, in pumping the cement down through the casing and forcing it upwardly around the outer surface of the casing or through perforations in the lower end of the casing into the formation desired to be sealed, the slurry will pass through narrow channels and small openings. Also, at these great depths high temperatures are encountered. Therefore, successful placement of the slurry requires that it remain fluid and pumpable at high temperatures for several hours before it begins to harden. It has been found that Portland and Portland type cement slurries can be retarded so that they meet all the above requirements for the satisfactory cementing of deep wells by the addition of carboxymethylcellulose (CMC) and salts thereof within certain definite limits as disclosed in my Patent No. 2,427,683, dated September 23, 1947.

One of the objects of my invention is to provide a cement of the above type in which the carboxymethylcellulose addition is made more effective.

Another object of the invention is to provide a slurry of the above cement.

These and other objects will be more apparent after referring to the following description.

I have found that dissolved salts and hydroxides in the cement solution, especially the calcium compounds, decrease the retarding effect of carboxymethylcellulose and salts of carboxymethylcellulose. The amount of this decrease varies according to the grade and type of carboxymethylcellulose and in some instances precipitation of all the carboxymethylcellulose addition results so that all of its retarding effect is lost. I have found that the effectiveness of the carboxymethylcellulose can be increased by the addition of alkali salts to the cement or cement slurry. Both organic and inorganic alkali salts are effective for this purpose. The following inorganic metal alkali salts were found to function well: sodium sulphate ($Na_2SO_4$), potassium sulphate ($K_2SO_4$), potassium chromate ($K_2Cr_2O_7$), sodium bromide ($NaBr$), sodium sulphite ($Na_2SO_3$), sodium thiosulphate ($Na_2S_2O_3$), potassium fluoride ($KF$), potassium nitrate ($KNO_3$), potassium iodide ($KI$) and potassium chloride ($KCl$). However, an account of cost and compatibility with cement and other desirable properties, the alkali sulphates $Na_2SO_4$ and $K_2SO_4$ are preferred.

The following organic salts were found to function well: potassium acetate ($KC_2H_3O_2$), potassium propionate ($KC_3H_5O_2$), potassium salicylate ($KC_7H_5O_3$), potassium benzoate ($KC_7H_5O_2$), and potassium lactate ($KC_3H_5O_3$).

Carboxymethylcellulose and its salts may be present in amounts ranging from .05 to .75% by weight of the dry cement and the alkali salt may be present in an amount between .25 and 1.30% by weight of the dry cement.

Tests were made using the cements identified in Table I below:

Table I.—Chemical composition and fineness

| Cement | $SiO_2$ | $Al_2O_3$ | $Fe_2O_3$ | Oxide Analysis, Percent | | | | Loss |
|---|---|---|---|---|---|---|---|---|
| | | | | CaO | MgO | MnO | $SO_3$ | |
| Sample A | 22.0 | 4.8 | 3.5 | 64.8 | 1.3 | 0.09 | 1.8 | 0.84 |
| Sample B | 22.6 | 4.9 | 4.1 | 62.7 | 2.1 | 0.36 | 1.9 | 0.97 |
| Sample C | 22.2 | 4.9 | 3.8 | 63.8 | 1.5 | 0.27 | 1.9 | 0.88 |

| Cement | Calculated Compound Composition, Percent | | | | | Alkalies, Percent | | | $Na_2O$ Equiv. |
|---|---|---|---|---|---|---|---|---|---|
| | $C_3S$ | $C_2S$ | $C_3A$ | $C_4AF$ | $CaSO_4$ | $K_2O$ | $Na_2O$ | Total | |
| Sample A | 54.0 | 22.4 | 6.8 | 10.6 | 3.1 | 0.77 | 0.25 | 1.02 | 0.76 |
| Sample B | 39.1 | 35.4 | 6.0 | 12.5 | 3.2 | 0.28 | 0.13 | 0.41 | 0.31 |
| Sample C | 47.1 | 28.2 | 6.5 | 11.6 | 3.2 | 0.53 | 0.17 | 0.70 | 0.52 |

| Cement | Fineness | |
|---|---|---|
| | Passing 325 Mesh, Percent | Wagner Surface, cm.²/g. |
| Sample A | 75.7 | 1,195 |
| Sample B | 63.7 | 1,155 |
| Sample C | 71.9 | 1,195 |

In making the tests, the inorganic salts and the carboxymethylcellulose were mixed with the dry cements and water added thereto in the manner described in my above mentioned patent. The salts of the organic acids were used in the form of solutions and these were dispersed in the mixing water before adding this water to the dry cement to which the carboxymethylcellulose had previously been added. Halliburton consistometer tests were made on the slurries at a temperature of 200° F. according to the method given in A. P. I. Code 32, First Edition. The following tables give the results of the tests.

*Table II.—Data showing retarding effect of one CMC product plus K₂SO₄ and Na₂SO₄*

1. SAMPLE A CEMENT

| Grade of CMC | Percent CMC | Salt | Percent Salt | Halliburton Consistometer Tests at 200° F., 40% Slurry—Slurry Viscosity in Poises at Time Indicated | | | | | | | | Thickening Time, Hr.:Min. |
|---|---|---|---|---|---|---|---|---|---|---|---|---|
| | | | | 0 | 0:15 | 0:30 | 1:00 | 2:00 | 3:00 | 4:00 | 5:00 | |
| None | | None | | 8 | 24 | 28 | 54 | | | | | 1:05 |
| No. 90 | .07 | ...do | | 9 | 18 | 14 | 10 | 10 | 25 | | | 3:35 |
| None | | Na₂SO₄ | 0.50 | 6 | 17 | 24 | 76 | | | | | 1:05 |
| Do | | Na₂SO₄ | 1.00 | 6 | 16 | 23 | 40 | | | | | 1:10 |
| No. 90 | .07 | Na₂SO₄ | 0.25 | 30 | 30 | 20 | 22 | 22 | 22 | 28 | | 4:26 |
| No. 90 | .07 | Na₂SO₄ | 0.50 | 30 | 9 | 7 | 7 | 8 | 8 | 24 | | 4:20 |
| No. 90 | .07 | Na₂SO₄ | 0.75 | 28 | 8 | 8 | 7 | 7 | 8 | 9 | | 5:07 |
| No. 90 | .07 | Na₂SO₄ | 1.00 | 28 | 8 | 8 | 9 | 11 | 15 | 18 | | 4:50 |
| None | | K₂SO₄ | 0.613 | 8 | 16 | 22 | 58 | | | | | 1:05 |
| Do | | K₂SO₄ | 1.227 | 7 | 18 | 23 | 40 | | | | | 1:05 |
| No. 90 | .07 | K₂SO₄ | 0.613 | 30 | 9 | 8 | 8 | 8 | 9 | 17 | | 4:50 |
| No. 90 | .07 | K₂SO₄ | 1.227 | 28 | 8 | 8 | 8 | 8 | 13 | 38 | | 4:20 |

2. SAMPLE B CEMENT

| Grade of CMC | Percent CMC | Salt | Percent Salt | 0 | 0:15 | 0:30 | 1:00 | 2:00 | 3:00 | 4:00 | 5:00 | Thickening Time, Hr.:Min. |
|---|---|---|---|---|---|---|---|---|---|---|---|---|
| None | | None | | 5 | 12 | 15 | 30 | | | | | 1:33 |
| No. 90 | .09 | ...do | | 7 | 16 | 20 | 35 | | | | | 1:35 |
| None | | Na₂SO₄ | 0.50 | 6 | 15 | 20 | 26 | | | | | 1:30 |
| Do | | Na₂SO₄ | 1.00 | 6 | 22 | 26 | 29 | | | | | 1:22 |
| No. 90 | .09 | Na₂SO₄ | 0.25 | 7 | 30 | 29 | 28 | | | | | 1:54 |
| No. 90 | .09 | Na₂SO₄ | 0.50 | 22 | 19 | 10 | 9 | 14 | 36 | | | 3:29 |
| No. 90 | .09 | Na₂SO₄ | 0.75 | 22 | 10 | 9 | 8 | 13 | 70 | | | 3:05 |
| No. 90 | .09 | Na₂SO₄ | 1.00 | 24 | 11 | 11 | 11 | 15 | 75 | | | 3:10 |
| None | | K₂SO₄ | 0.613 | 4 | 22 | 16 | 20 | | | | | 1:30 |
| Do | | K₂SO₄ | 1.227 | 5 | 12 | 21 | 25 | | | | | 1:37 |
| No. 90 | .09 | K₂SO₄ | 0.613 | 8 | 15 | 10 | 8 | 8 | 22 | | | 4:00 |
| No. 90 | .09 | K₂SO₄ | 1.227 | 22 | 10 | 10 | 8 | 10 | 29 | | | 3:30 |

3. SAMPLE C CEMENT

| Grade of CMC | Percent CMC | Salt | Percent Salt | 0 | 0:15 | 0:30 | 1:00 | 2:00 | 3:00 | 4:00 | 5:00 | Thickening Time, Hr.:Min. |
|---|---|---|---|---|---|---|---|---|---|---|---|---|
| None | | None | | 8 | 22 | 28 | 34 | | | | | 1:15 |
| Do | | Na₂SO₄ | 0.50 | 6 | 20 | 22 | 40 | | | | | 1:18 |
| Do | | Na₂SO₄ | 1.00 | 6 | 19 | 21 | 34 | | | | | 1:20 |
| No. 90 | .09 | None | | 8 | 18 | 21 | 22 | 100 | | | | 2:00 |
| No. 90 | .09 | Na₂SO₄ | 0.25 | 9 | 32 | 25 | 24 | 24 | 100 | | | 3:00 |
| No. 90 | .09 | Na₂SO₄ | 0.50 | 20 | 24 | 12 | 8 | 8 | 8 | 8 | 8 | 5:55 |
| No. 90 | .09 | Na₂SO₄ | 0.75 | 28 | 12 | 8 | 8 | 8 | 8 | 8 | 8 | 6:20 |
| No. 90 | .09 | Na₂SO₄ | 1.00 | 28 | 16 | 8 | 8 | 7 | 8 | 100 | | 4:00 |
| None | | K₂SO₄ | 0.613 | 6 | 19 | 19 | 39 | | | | | 1:16 |
| Do | | K₂SO₄ | 1.227 | 7 | 16 | 22 | 32 | | | | | 1:21 |
| No. 90 | .09 | None | | 8 | 18 | 21 | 22 | 100 | | | | 2:00 |
| No. 90 | .09 | K₂SO₄ | 0.613 | 8 | 21 | 30 | 7 | 6 | 17 | | | 3:45 |
| No. 90 | .09 | K₂SO₄ | 0.921 | 28 | 16 | 8 | 8 | 7 | 7 | 20 | | 4:25 |
| No. 90 | .09 | K₂SO₄ | 1.227 | 22 | 20 | 9 | 7 | 7 | 8 | | | 3:55 |

*Table III.—Data showing retarding effect of three additional CMC products plus K₂SO₄ and Na₂SO₄*

SAMPLE C CEMENT

| Grade of CMC | Percent CMC | Salt | Percent Salt | Halliburton Consistometer Tests at 200° F., 40% Slurry—Slurry Viscosity in Poises at Time Indicated | | | | | | | | Thickening Time, Hr.:Min. |
|---|---|---|---|---|---|---|---|---|---|---|---|---|
| | | | | 0 | 0:15 | 0:30 | 1:00 | 2:00 | 3:00 | 4:00 | 5:00 | |
| No. 70 | .09 | None | | 8 | 18 | 22 | 26 | 62 | | | | 2:05. |
| No. 70 | .09 | Na₂SO₄ | 0.25 | 9 | 18 | 26 | 9 | 8 | 8 | 8 | 8 | 5:55. |
| No. 70 | .09 | Na₂SO₄ | 0.50 | 9 | 4 | 4 | 8 | 8 | 8 | 8 | 8 | +6 hr. |
| No. 70 | .09 | Na₂SO₄ | 0.75 | 8 | 4 | 4 | 11 | 12 | 12 | 12 | 14 | +6 hr. |
| No. 70 | .09 | Na₂SO₄ | 1.00 | 10 | 9 | 9 | 9 | 9 | 13 | 14 | | 4:10. |
| NH₄CMC | .09 | None | | 8 | 16 | 21 | 21 | 100 | | | | 2:00. |
| NH₄CMC | .09 | Na₂SO₄ | 0.25 | 8 | 22 | 18 | 8 | 7 | 7 | 7 | 7 | +6 hr. |
| NH₄CMC | .09 | Na₂SO₄ | 0.50 | 20 | 8 | 8 | 8 | 7 | 8 | 8 | 8 | +6 hr. |
| NH₄CMC | .09 | Na₂SO₄ | 0.75 | 19 | 8 | 6 | 7 | 7 | 7 | 7 | 7 | +6 hr. |
| NH₄CMC | .09 | Na₂SO₄ | 1.00 | 14 | 10 | 8 | 7 | 8 | 8 | 8 | 8 | +6 hr. |
| No. 12 | ¹.15 | None | | 19 | 18 | 20 | 20 | 48 | | | | 2:17. |
| No. 12 | .15 | Na₂SO₄ | 0.25 | 10 | 13 | 13 | 13 | 15 | 16 | 40 | | 4:30. |
| No. 12 | .15 | Na₂SO₄ | 0.50 | 8 | 8 | 8 | 9 | 11 | 12 | 18 | | 4:44. |
| No. 12 | .15 | Na₂SO₄ | 0.75 | 16 | 17 | 18 | 22 | 22 | 24 | 70 | | 4:06. |
| No. 12 | .15 | Na₂SO₄ | 1.00 | 12 | 14 | 17 | 19 | 19 | 19 | 74 | | 4:03. |
| No. 70 | .09 | None | | 8 | 18 | 22 | 26 | 62 | | | | 2:05. |
| No. 70 | .09 | K₂SO₄ | 0.613 | 9 | 8 | 8 | 8 | 7 | 7 | 9 | | 4:50. |
| No. 70 | .09 | K₂SO₄ | 0.921 | 15 | 9 | 9 | 8 | 8 | 8 | 14 | | 4:43. |
| No. 70 | .09 | K₂SO₄ | 1.227 | 12 | 6 | 6 | 6 | 6 | 6 | 9 | | 4:50. |
| NH₄CMC | .09 | None | | 8 | 16 | 21 | 26 | 100 | | | | 2:00. |
| NH₄CMC | .09 | K₂SO₄ | 0.613 | 9 | 13 | 8 | 8 | 8 | 8 | 8 | 8 | 6:30. |
| NH₄CMC | .09 | K₂SO₄ | 0.921 | 24 | 8 | 9 | 8 | 8 | 8 | 8 | 12 | 5:55. |
| NH₄CMC | .09 | K₂SO₄ | 1.227 | 12 | 10 | 9 | 8 | 8 | 8 | 8 | 10 | 5:50. |
| No. 12 | .15 | None | | 9 | 18 | 20 | 20 | 48 | | | | 2:17. |
| No. 12 | .15 | K₂SO₄ | 0.613 | 8 | 10 | 20 | 9 | 9 | 12 | 26 | | 4:35. |
| No. 12 | .15 | K₂SO₄ | 0.921 | 10 | 12 | 12 | 13 | 15 | 15 | 48 | | 4:20. |
| No. 12 | .15 | K₂SO₄ | 1.227 | 9 | 14 | 14 | 16 | 16 | 16 | 60 | | 4:08. |

¹ Crude product containing 60% active material.

Table IV.—Data showing retarding effect of .09% CMC 70 low viscosity plus other inorganic and organic salts

| Salt | Percent | Halliburton Consistometer Tests at 200° F., 40% Slurry—Slurry Viscosity in Poises at Time Indicated | | | | | | | | Thickening Time, Hr.:Min. |
|---|---|---|---|---|---|---|---|---|---|---|
| | | 0 | 0:15 | 0:30 | 1:00 | 2:00 | 3:00 | 4:00 | 5:00 | |
| $K_2Cr_2O_7$ | 1.04 | 10 | 9 | 9 | 10 | 9 | 9 | 9 | 9 | 8:20 |
| NaBr | 0.37 | 9 | 8 | 8 | 8 | 8 | 8 | 8 | 8 | +9:00 |
| $Na_2SO_3$ | 0.44 | 7 | 10 | 10 | 10 | 11 | 12 | 12 | 12 | +9:00 |
| $Na_2S_2O_3$ | 0.87 | 8 | 7 | 8 | 8 | 9 | 9 | 9 | 9 | +9:00 |
| KF | 0.33 | 13 | 18 | 19 | 22 | 24 | 27 | 34 | | 4:35 |
| $KNO_3$ | 0.36 | 17 | 9 | 9 | 9 | 9 | 9 | 9 | 12 | +8:30 |
| KI | 0.59 | 14 | 8 | 8 | 8 | 8 | 8 | 8 | 8 | 7:15 |
| KCl | 0.26 | 12 | 10 | 9 | 9 | 9 | 9 | 9 | 9 | +7:30 |
| Pot. Acetate, $KC_2H_3O_2$ | 0.35 | 12 | 8 | 8 | 9 | 8 | 8 | 8 | 9 | +6:30 |
| Pot. Propionate, $KC_3H_5O_2$ | 0.46 | 10 | 8 | 8 | 9 | 8 | 8 | 8 | 9 | +6:30 |
| Pot. Salicylate, $KC_7H_5O_3$ | 0.62 | 50 | 38 | 32 | 28 | 24 | 32 | 21 | 26 | 5:50 |
| Pot. Benzoate, $KC_7H_5O_2$ | 0.75 | 15 | 12 | 14 | 16 | 16 | 18 | 22 | 19 | +6:30 |
| Pot. Lactate, $KC_3H_5O_3$ | 0.45 | 36 | 22 | 18 | 17 | 20 | 22 | 22 | 20 | +6:30 |
| None | | 8 | 18 | 22 | 26 | 62 | | | | 2:05 |

All of the samples of carboxymethylcellulose referred to in Tables II and III with the exception of the NH₄CMC are various grades of the sodium salt of carboxymethylcellulose. Nos. 70 and 90 are terms designated by the manufacturer as a measure of the degree of substitution. The No. 70 carboxymethylcellulose is a low viscosity material. The No. 12 carboxymethylcellulose is a crude sodium salt of carboxymethylcellulose having a low viscosity.

It will be seen that in no instance did the added alkali salt alone increase the thickening time of the cement. When using the cement of Sample A the addition of .07% of carboxymethylcellulose No. 90 increased the thickening time from 1 hr. 5 min. to 3 hr. 35 min. The further addition of either Na₂SO₄ or K₂SO₄ increased the thickening time to between 4 hr. 20 min. and 5 hr. 7 min. When using the cement of Sample B, the addition of .09% of carboxymethylcellulose No. 90 did not increase the thickening time, but the further addition of either Na₂SO₄ or K₂SO₄ increased the thickening time from 1 hr. 33 min. to between 1 hr. 54 min. and 4 hr. The thickening time of the cement of Sample C was increased only slightly (from 1 hr. 15 min. to approximately 2 hr.) by the addition of No. 90 carboxymethylcellulose, No. 70 low viscosity carboxymethylcellulose, NH₄CMC and No. 12 carboxymethylcellulose. However, when alkali sulphates were added thereto, the same proportions of the carboxymethylcellulose products increased the thickening time to between approximately 3 and 6 hrs.

While several embodiments of my invention have been described, it will be apparent that other adaptations and modifications may be made without departing from the scope of the following claims.

I claim:

1. A cement capable of forming a fluid slurry when mixed with water, said cement having a retarded set at temperatures above atmospheric, said cement comprising a Portland cement containing water soluble alkalis and additives including from .05 to .75% by weight of the dry cement of at least one of the group consisting of carboxymethylcellulose and salts of carboxymethylcellulose, and from .25 to 1.30% by weight of the dry cement of at least one water soluble alkali metal salt to increase the retarding effect of the carboxymethylcellulose and salts of carboxymethylcellulose.

2. A cement capable of forming a fluid slurry when mixed with water, said cement having a retarded set at temperatures above atmospheric, said cement comprising a Portland cement containing water soluble alkalis and additives including from .05 to .75% by weight of the dry cement of at least one of the group consisting of carboxymethylcellulose and salts of carboxymethylcellulose, and from .25 to 1.30% by weight of the dry cement of at least one water soluble alkali sulphate from the group consisting of sodium sulphate and potassium sulphate to increase the retarding effect of the carboxymethylcellulose and salts of carboxymethylcellulose.

3. A hydraulic cement slurry having a retarded set at temperatures above atmospheric, comprising Portland cement containing water soluble alkalis, water, and additives including from .05 to .75% by weight of the dry cement of at least one of the group consisting of carboxymethylcellulose and salts of carboxymethylcellulose, and from .25 to 1.30% by weight of the dry cement of at least one water soluble alkali metal salt to increase the retarding effect of the carboxymethylcellulose and salts of carboxymethylcellulose.

4. A hydraulic cement slurry having a retarded set at temperatures above atmospheric, comprising Portland cement containing water soluble alkalis, water, and additives including from .05 to .75% by weight of the dry cement of at least one of the group consisting of carboxymethylcellulose and salts of carboxymethylcellulose, and from .25 to 1.30% by weight of the dry cement of at least one water soluble alkali sulphate from the group consisting of sodium sulphate and potassium sulphate to increase the retarding effect of the carboxymethylcellulose and salts of carboxymethylcellulose.

NORMAN C. LUDWIG.

References Cited in the file of this patent

UNITED STATES PATENTS

| Number | Name | Date |
|---|---|---|
| 1,868,372 | Swift | July 19, 1932 |
| 2,292,616 | Dailey | Aug. 11, 1942 |
| 2,307,270 | Hodge | Jan. 5, 1943 |
| 2,410,390 | Paley | Oct. 29, 1946 |
| 2,427,683 | Ludwig | Sept. 23, 1947 |

OTHER REFERENCES

"Chemistry of Cement and Concrete" by F. M. Lea and C. H. Desch (1935), pages 66 and 158.